US006599555B2

(12) United States Patent
Toves

(10) Patent No.: US 6,599,555 B2
(45) Date of Patent: Jul. 29, 2003

(54) PROCESS FOR MAKING A REDUCED-CALORIE FRUIT AND/OR VEGETABLE SPREAD

(75) Inventor: Frances Ann Toves, Reno, NV (US)

(73) Assignee: BocaBear Foods, Inc., Reno, NV (US)

(*) Notice: Subject to any disclaimer, the term of this patent is extended or adjusted under 35 U.S.C. 154(b) by 0 days.

(21) Appl. No.: 09/803,127

(22) Filed: Mar. 8, 2001

(65) Prior Publication Data

US 2002/0197385 A1 Dec. 26, 2002

(51) Int. Cl.$^7$ ............... A23L 1/0524; A23L 1/052; A23L 1/06
(52) U.S. Cl. ............... 426/639; 426/519; 426/521; 426/577
(58) Field of Search ............... 426/639, 519, 426/521, 577

(56) References Cited

U.S. PATENT DOCUMENTS

| | | | |
|---|---|---|---|
| 3,846,570 A | 11/1974 | Vetter et al. | |
| 3,947,604 A | 3/1976 | McGinley et al. | |
| 4,789,553 A | 12/1988 | McIntyre et al. | |
| 4,880,648 A | * 11/1989 | Stamer | 426/639 |
| 5,112,554 A | 5/1992 | Perez et al. | |
| 5,190,785 A | * 3/1993 | Oelsner | 426/577 |
| 5,260,083 A | 11/1993 | Brain et al. | |
| 5,397,588 A | 3/1995 | Antenucci et al. | |
| 5,468,512 A | 11/1995 | Verschuren et al. | |
| 6,183,801 B1 | 2/2001 | Warendorf | |
| 6,303,778 B1 | * 10/2001 | Smits et al. | 536/128 |
| 2002/0001657 A1 | 1/2002 | Brake et al. | |

FOREIGN PATENT DOCUMENTS

| EP | 0862864 | * 4/1998 |
|---|---|---|
| EP | 0862864 A2 | 9/1998 |

* cited by examiner

*Primary Examiner*—Helen Pratt
(74) *Attorney, Agent, or Firm*—R. Stevan Coursey; Troutman Sanders LLP; Jacqueline Haley

(57) ABSTRACT

A process for making, or preparing, a reduced-calorie fruit and/or vegetable spread product including whole, natural fruit(s) and/or vegetable(s), or combinations thereof, having improved flavor, texture (e.g., mouth feel), color, and nutritional value as compared to fruit and/or vegetable spread products made with conventional processes. More particularly, the process of the present invention includes a pasteurization step, using a swept-surface heat exchanger, for making fruit and/or vegetable spread products having reduced caloric and sugar content and having increased soluble dietary fiber content. The minimal processing of the present process enables the produced fruit and/or vegetable spread products to retain flavor, texture, color, vitamins and other nutrients which are, typically, lost in traditionally-processed fruit and/or vegetable spread products. The process' preferable use of squeeze tube packaging eliminates the need for cutlery in order to use or consume the fruit and/or vegetable spread products and serves to make the products more portable.

14 Claims, No Drawings

PROCESS FOR MAKING A REDUCED-CALORIE FRUIT AND/OR VEGETABLE SPREAD

FIELD OF THE INVENTION

The present invention relates, generally, to the field of reduced-calorie fruit and vegetable spread products and, in its preferred embodiments, to a process for making, or preparing, a reduced-calorie, natural, whole-fruit and/or vegetable spread product fortified with dietary fiber.

BACKGROUND OF THE INVENTION

Many individuals apply fruit or vegetable spreads, such as jams, jellies, purees and preserves, to other food products in order to enhance the flavor and nutritional value of the other food products with the taste and nutritional content of the fruit or vegetable spreads. Such fruit or vegetable spreads, generally, include a fruit or vegetable ingredient and a saccharide ingredient, but may also contain nutritive carbohydrate sweeteners, spice, acidifying agents, pectin (i.e., in an amount sufficient to compensate for natural deficiency in fruit or vegetable), buffering and antifoaming agents, preservatives, and other ingredients or agents for improving or preserving their taste, nutritional value, and quality. The saccharide ingredient in jams, jellies and preserves is typically sugar, which provides sweetening, bulk, texture, and mouth feel. The sugar also reduces the water activity level, thereby reducing pathogen growth.

Typically, the preparation of jams, jellies, purees and preserves comprises a number of steps. Initially, fruit ingredients, sweeteners and water are blended together. A stabilizing solution, such as pectin, is then prepared and added to the fruit, sweetener, and water blend to produce a mixture. During subsequent cooking of the mixture, unwanted water is evaporated to create a cooked mixture having a desired soluble solids content. Finally, the cooked mixture is placed in suitable receptacles, such as jars, through a hot-filling process. Unfortunately, the steps of cooking and evaporation cause the fruit spread to lose flavor intensity (i.e., through boiling-off), texture (i.e., through breakdown of the fruit fibers into mush), natural color (i.e., through darkening or oxidation), and nutrients (i.e., through boiling-off).

Various inventors have attempted to resolve the above-described problems, deficiencies or difficulties with fruit spreads and the manufacture thereof. For instance, in U.S. Pat. No. 5,190,785, Oelsner discloses a process for evaporating the water from a fruit-based product while attempting to preserve flavor. Oelsner's method includes removing portions of fruit and glucose syrup from a mixture of these components with sugar. The removed portions and the remaining mixture are then separately boiled to evaporate the water from each. The removed portions are boiled in an open vat, while the remaining mixture is boiled in a closed cooking vat. After recombining the boiled mixtures, the product is pasteurized and packaged, but as noted in the Oelsner patent, evaporation of the excess water results in flavor loss.

Other inventors and manufacturers, in response to studies indicating that excessive amounts of sugar in food products may contribute to or exacerbate many health problems and to the resultant desire among consumers for low-sugar fruit spreads, have attempted to enhance the healthiness of fruit spreads by employing sugar substitutes to produce low-calorie, low-sugar products. However, as described below, such sugar substitutes and processes for making fruit spreads which incorporate them, tend to create fruit spreads having various difficulties, including those described in U.S. Pat. No. 5,397,588. In that patent, Antenucci discloses that artificially Is flavored fruit spreads are deficient in sensory (sweetness intensity, quality and flavor), visual (color, clarity and gloss), and textural (firmness, body, mouth feel, and spreadability) properties as compared to their naturally sweetened counterparts. Antenucci, attempting to resolve such deficiencies, incorporated a multi-component gum system to impart desirable textural properties to pectin or carrageenan gel, but utilized the conventional method of fruit spread preparation described above and, as a result of the cooking step, produced a fruit spread deficient in flavor.

In a somewhat different approach to improving the texture of low-calorie fruit spreads disclosed in U.S. Pat. No. 5,260,083, Brain incorporated a fat replacement ingredient into a fruit spread rather than using a reduced-calorie sweetener. By using the fat replacement as an additive in a generally fat-free food, Brain was able to simulate the texture and lubricity of fat in a fruit spread product. However, the fruit spread required the creation of a micro-particulated mixture which destroyed the natural texture of the spread's fruit. Also, unfortunately, use of the fat replacement ingredient actually resulted in a higher calorie product, while cooking of the mixture caused the loss of some of the natural flavor of the spread's fruit.

Still other inventors and manufacturers have attempted to produce jams, jellies and other fruit-based products with a reduced caloric content by substituting oligofructose and/or inulin in place of some of the sugar, while taking advantage of the known bulking properties of such fructans. Unfortunately, because the above-described cooking process for producing jams and jellies tends to degrade the oligofructose and/or inulin at high temperatures and low pH, and because the shelf-life of products containing oligofructose may be inadequate, these attempts have proven difficult. In an attempt to extend the shelf-life of products containing oligofructose, pasteurization processes have been used, even though it is known that the pasteurization conditions may cause the oligofructose to degrade and, hence, be detrimental to the quality of the products. Verschuren, in U.S. Pat. No. 5,468,512, addressed the difficulties associated with the pasteurization of products made with oligofructoses and sets forth specific conditions (i.e., the oligofructoses are heated in a very narrow range of temperature from 72 degrees to 82 degrees Celsius for a period of 10 to 300 seconds) for the successful pasteurization of such products. However, according to the disclosure of Verschuren, the texture of inulin is destroyed at temperatures higher than 82 degrees Celsius.

Finally, still other inventors and manufacturers have attempted to resolve the, as yet undiscussed, problem of microbiological contamination which may occur during the preparation of fruit spreads. To reduce the likelihood of microbiological contamination, Waredorf determined that a water-based jelly product having whole fruit pieces may be hot-filled into appropriate receptacles following a pasteurization process to kill off microbes. In U.S. Pat. No. 6,183,801, Waredorf discloses that microbiological contamination may be overcome by hot-filling receptacles at a temperature above 70 degrees Celsius. According to the Waredorf process, the form of the water-based jelly may be maintained during the heating process by the addition of a thickener, xanthan, and a gelling agent, including inulin, to the water-based jelly. After pasteurization of the water-based jelly, whole fruit is injected into the pasteurized jelly product just prior to hot-filling. Unfortunately, because the fruit must be stable against processing stress, certain varieties, especially berry varieties, of fruit cannot be used in fruit spread products made with the Waredorf process. Moreover, fruit spread products made with the Waredorf process have, or tend to have, a texture similar to that of gelatin desserts (e.g., JELL-O®), which are very watery and not suitable for spreading, for instance, on toast. Further, even at refrigerated temperatures, fruit spread products prepared using the Waredorf process have an extremely short shelf-life.

Therefore, there exists in the industry, a need for a process for making a reduced-calorie, natural, whole-fruit and/or vegetable spread with an adequate shelf-life which does not diminish the natural flavor, texture, color, or nutritional content of the fruit(s) and/or vegetable(s) therein, and for addressing these and other related, and unrelated, problems.

SUMMARY OF THE INVENTION

Briefly described, the present invention comprises a process for making, or preparing, a reduced-calorie fruit and/or vegetable spread product including whole, natural fruit(s) and/or vegetable(s), or combinations thereof. More particularly, in its preferred embodiments, the present invention comprises a process, including a pasteurization step, for making a fruit and/or vegetable spread product having reduced caloric and sugar content and having increased soluble dietary fiber content. Importantly, the process produces a fruit and/or vegetable spread product without the discoloration and the reductions in flavor, texture, and nutrients that occur with fruit or vegetable spread products made with conventional processes which include a cooking and/or evaporation step. The fruit and/or vegetable spread products produced by the process of the present invention provide: flavor approaching that of fresh fruits (or vegetables); texture and mouth feel superior to that of traditionally-prepared jams, jellies, purees and preserves; and reduced caloric content as compared to traditionally-prepared fruit or vegetable spread products.

The process of the present invention avoids the flavor, texture, and nutrient losses that occur during conventional processing of fruit and/or vegetable spread products by using a high-temperature short-time (HTST) pasteurization process instead of the traditional cooking and evaporation processes. By combining fruit(s), vegetable(s), or a combination thereof with a homogenized slurry of other ingredients, including at least (i) sweetener, such as, for example and not limitation, fruit juice concentrate, invert syrup, corn syrup, high fructose corn syrups, maltose, cane syrup, honey, polyols such as sorbitol, mannitol, glycerol, propylene glycol, fruit juices or any mixtures thereof, and, (ii) soluble dietary fiber such as, for example and not limitation, fructo-oligosaccharide or inulin, and pectin, and by then pasteurizing the combined mixture in, preferably, a swept-surface heat exchanger, a shelf-stable fruit and/or vegetable spread product having less sugar (and, hence, reduce caloric content) and more dietary fiber is produced. The resulting fruit and/or vegetable spread products have good textural quality, intense flavor, and maintain the color and structural integrity of the whole fruit(s) and/or vegetable (s) present therein.

According to the preferred embodiments described herein, the process of the present invention uses less sugar than is used in traditional fruit and/or vegetable spread processing. Such reduction of the sugar content lowers the incidence of discoloration in the resulting fruit and/or vegetable spreads products (i.e., as compared to the discoloration which occurs in traditionally, or conventionally, prepared fruit and/or vegetable spread products) which occurs as a consequence of non-enzymatic browning (also referred to as "Maillard Browning"). The process' use of less sugar also results in higher water activity levels during preparation that are more amenable to pasteurization, thereby enhancing the pasteurization process.

Because the process of the present invention utilizes whole fruit(s) and/or vegetable(s) and/or combinations thereof in lieu of fruit or vegetable juices for flavoring, the resulting fruit and/or vegetable spread products have improved taste and texture when compared to fruit and/or vegetable spread products traditionally made with such fruit or vegetable juices. By using pasteurization for microkill instead of cooking as in conventional fruit and/or vegetable spread processing, the process of the present invention does not "cook down" whole fruit(s) and/or vegetable(s) into mush and does not destroy their structural integrity, and thereby enhances the texture of the resulting fruit and/or vegetable spread products. Also, by using pasteurization instead of cooking, the vitamins and other nutrients of the whole fruit(s) and/or vegetable(s) are not lost by the present process to the same extent that they are lost by the evaporation of vapor during the cooking step of conventional processing.

The process of the present invention additionally produces fruit and/or vegetable spread products that may naturally fortify a consumer's gastrointestinal tract. More particularly, the addition of dietary fiber (i.e., in the preferable form of inulin) by the process to the fruit and/or vegetable spread products produced thereby, may cause increased absorption of nutrients in the consumer's gastrointestinal tract, thus providing a natural health food.

In addition to the previously described benefits of the present invention's use of high-temperature short-time (HTST) pasteurization, such pasteurization contributes to increasing the shelf stability of the fruit and/or vegetable spread products made by the process. The shelf stability of the resulting fruit and/or vegetable spread products is further enhanced by the heating and packaging steps of the process which are conducted under substantially closed conditions to aid in eliminating the possibility of product contamination and to reduce product oxidation (and, hence, discoloration). Notably, the results of testing on fruit and/or vegetable spread products prepared by the process of the present invention seem to indicate that the shelf-life of such products is significantly longer than one year.

Further, the process of the present invention enables packaging of fruit and/or vegetable spread products made thereby, preferably, in squeezable tubes. Such packaging tends to keep the fruit and/or vegetable spread products hygienically safe and substantially free from contaminants and discoloration due to oxidation of the fruit(s) and/or vegetable(s) therein (i.e., due to reduced exposure to air) during repeated use. Such packaging also eliminates the need for cutlery in order to use or consume the fruit and/or vegetable spread products and serves to make the products more portable.

It is therefore an object of the present invention to make a reduced-calorie, natural, whole-fruit and/or vegetable spread product which suffers less reduction of the natural flavor of the fruit(s) and/or vegetable(s) therein during processing than fruit and/or vegetable spread products made with conventional processes.

Another object of the present invention to make a reduced-calorie, natural, whole-fruit and/or vegetable spread product which suffers less loss of the texture of the fruit(s) and/or vegetable(s) therein during processing than fruit and/or vegetable spread products made with conventional processes.

Still another object of the present invention to make a reduced-calorie, natural, whole-fruit and/or vegetable spread product which suffers less discoloration of the fruit(s) and/or vegetable(s) therein during processing than fruit and/or vegetable spread products made with conventional processes.

Still another object of the present invention to make a reduced-calorie, natural, whole-fruit and/or vegetable spread product which suffers less loss of the nutritional content of the fruit(s) and/or vegetable(s) therein during processing than fruit and/or vegetable spread products made with conventional processes.

Still another object of the present invention to make a reduced-calorie, natural, whole-fruit and/or vegetable spread product having better flavor than fruit and/or vegetable spread products made with conventional processes.

Still another object of the present invention to make a natural, whole-fruit and/or vegetable spread product having fewer calories than fruit and/or vegetable spread products made with conventional processes.

Still another object of the present invention to make a reduced-calorie, natural, whole-fruit and/or vegetable spread product having less sugar than fruit and/or vegetable spread products made with conventional processes.

Still another object of the present invention to make a reduced-calorie, natural, whole-fruit and/or vegetable spread product having more dietary fiber than fruit and/or vegetable spread products made with conventional processes.

Still another object of the present invention to make a reduced-calorie, natural, whole-fruit and/or vegetable spread product incorporating soluble dietary fiber, such as inulin, into a fruit and/or vegetable spread product without adversely affecting the texture and/or color of the product.

Still another object of the present invention is to make a reduced-calorie, natural, whole-fruit and/or vegetable spread product having better texture than fruit and/or vegetable spreads made with conventional processes.

Still another object of the present invention is to make a reduced-calorie, natural, whole-fruit and/or vegetable spread product having more natural color than fruit and/or vegetable spreads made with conventional processes.

Still another object of the present invention is to make a reduced-calorie, natural, whole-fruit and/or vegetable spread product having better nutritional content, or value, than fruit and/or vegetable spreads made with conventional processes.

Still another object of the present invention is to make a reduced-calorie, natural, whole-fruit and/or vegetable spread product having shelf stability at least comparable to that of fruit and/or vegetable spreads made with conventional processes.

Other objects, features, and advantages of the present invention will become apparent upon reading and understanding the present specification.

DETAILED DESCRIPTION OF THE PREFERRED EMBODIMENTS

The present invention comprises a process for manufacturing, or preparing, a reduced-calorie fruit and/or vegetable spread product including whole, natural fruits or vegetables, or combinations thereof. According to a first preferred embodiment of the present invention, the process includes a plurality of steps. First, a portion of the total quantity of whole fruit(s) and/or vegetable(s) in the spread (or a combination thereof), a substance containing soluble dietary fiber, and pectin are combined and mixed to form a slurry. Then, the remaining portion of the total quantity of whole fruit(s) and/or vegetable(s) (or a combination thereof) and liquid sweetener are combined with the slurry to form a resulting mixture, or blend, which is subsequently mixed to a substantially even consistency. Finally, the resulting mixture is pasteurized and packaged in product form.

Described in more detail, the first step of the first preferred embodiment of the present invention comprises combining a portion of the overall amount of fruit(s) and/or vegetable(s), or a combination thereof, which are in the final spread product with a dietary fiber component, and pectin. Additional ingredients such as glycerol or propylene glycol, for example and not limitation, may optionally be added, in accordance with alternate embodiments, to the fruit(s) and/or vegetable(s), dietary fiber, and pectin. The combined ingredients are then, preferably, mixed with a mixer at high speed and at room temperature for a period of time sufficient to form a slurry or emulsion. A mixer, acceptable in accordance with the first preferred embodiment, is a high shear liquid mixer, such as that available from Breddo Likwifier (a division of American Ingredients) or from Greerco High Shear Mixers (a division of Chemineer Co.). It is understood that the scope of the present invention includes the use of other types of mixers available from other vendors and the use of other mixing methods. It is also understood that, in accordance with alternate embodiments of the process, other ingredients may, optionally, be added to the slurry to provide variations in flavor, color and/or texture. Such other additional ingredients include, for example and not limitation, spices, acidifying agents, antioxidants, isoflavins, soy proteins, natural flavors and colors, buffering agents, preservatives, antifoaming agents and nutritive carbohydrate sweeteners.

Proceeding in accordance with the first preferred embodiment, the emulsified slurry is combined with the remaining fruit(s), vegetable(s), or combination thereof (i.e., of the total quantity of fruit(s) and/or vegetable(s) of the final spread product) to impart flavor and with a liquid sweetener. The slurry, fruit(s) and/or vegetable(s), and liquid sweetener are then mixed in a mixer for a period of time appropriate to produce a mixture, or blend, having an even and desired consistency. During combination and mixing, the temperature of the mixture, or blend, is kept at or below room temperature until the blend is heated in a scraped-surface heat exchanger, as described below, to aid in preventing flavor loss and/or color degradation. Preferably, the mixer is a scraped-surface mixer such as that available from Groen (i.e., Dover Industries Co.). It is understood, however, that the scope of the present invention includes the use of other types of mixers available from the same or different vendors.

Once the mixture, or blend, has been mixed to an even consistency, the mixture is pasteurized by raising and holding the temperature of the blend, preferably, at a temperature in the range of 165° F. (74° C.) to about 225° F. (108° C.) for a period of time (i.e., "hold time") between 10 seconds and 10 minutes, thereby killing any microbes that may be present in the blend. The required temperature and hold time are determined by the types of fruit(s) and/or vegetable(s) being used in the spread product and, for certain fruit(s) and/or vegetable(s), respective temperatures and hold times of 95° C. and 100 seconds are appropriate. Generally, higher temperatures are combined with shorter residence times to provide satisfactory pasteurization.

According to the first preferred embodiment of the present invention, the pasteurization of the blend is performed in a swept-surface heat exchanger having one or more cylinders of a particular size by pumping, or passing, the blend therethrough. The precise number and size of the cylinders is, generally, based upon the capacity and throughput desired for the process. A swept-surface heat exchanger, acceptable in accordance with the first preferred embodiment, includes a single cylinder, six inches in diameter by six feet in length. An acceptable swept-surface heat exchanger also includes a jacket through which a heat exchange medium such as low pressure steam or hot water passes to cause heating of the blend in the cylinder. The precise length of the cylinder, or holding tube, is based on the particular spread product and the combination of temperature and associated residence time needed to effect pasteurization. Such swept-surface heat exchangers are commonly found in the food industry and are available from vendors such as APV, Cherry Burrel, and Alpha-Laval. It is understood that the scope of the present invention includes the use of other temperatures, hold times, forms of equipment, and methods for pasteurizing the blend.

After pasteurization of the blend, the resulting spread product (i.e., a fruit and/or vegetable spread), is then partially cooled to a temperature in the range of 45° F. to about 165° F. Preferably, the partial cooling of the blend is accomplished by pumping, or passing, the blend through a second swept-surface heat exchanger which is substantially similar to the first swept-surface heat exchanger employed, as described above, to pasteurize the blend. However, in order to cool the blend, the heat exchange medium, preferably, includes, but is not limited to, cold water, sweet water, or a refrigerant.

Once the spread product is partially cooled, or chilled, the spread product is packaged, with the packaging being sealed immediately to minimize the exposure to air and, hence, to new microbes, spores, and other forms of possible contaminants. Preferably, the packaging includes squeezable tubes which are filled with the partially cooled blend through use of a tube filler. The tubes are then further chilled to refrigeration temperatures to protect against the breakdown of the fruit spread's texture, flavor, and color. It is important to note that, at lower blend temperatures, the packaging, or tube filling, should be performed in clean rooms to aid in preventing post-processing contamination. It is also important to note that the scope of the present invention includes other forms of packaging through use of other types of packaging equipment.

In accordance with a second preferred embodiment of the present invention substantially similar to the first preferred embodiment, a slurry is prepared from liquid sweetener, soluble dietary fiber and pectin. The slurry is then combined and mixed with the flavor-imparting fruit(s), vegetable(s), or combination thereof, to form a blend. After combination and mixing, the blend is pasteurized and packaged using a method substantially like that of the first preferred embodiment.

The term "sweetener," as used herein, includes any substance capable of imparting sweetness to a product. Examples of contemplated sweeteners include, but are not limited to, fruit juice concentrate, white sugar, raw sugar, fructose, dextrose, fruit juices, corn syrup, artificial sweeteners, including aspartame, sucralose, acesulfame and saccharine, stevia, licorice root, rice syrup, honey, sugar alcohols or any combination thereof. In accordance with the preferred embodiments of the present invention, the amount of sweetener added during processing is between about 5 percent to about 50 percent, by weight, of the fruit spread product. The amount of sweetener used, in proportion to the other ingredients, varies according to the particular fruit(s), vegetable(s), or combination of fruit(s) and vegetable(s) used in the product.

As used herein, the term "dietary fiber" includes any carbohydrate capable of providing bulking properties to the fruit and/or vegetable spread product, including, but not limited to, inulin and other plant starches and fructo-oligosaccharides. Inulin is a term applied to a water soluble, heterogeneous blend of fructose polymers found widely distributed in nature as plant storage carbohydrates. Oligofructose is a sub-group of inulin consisting of polymers with a degree of polymerization (DP) of 10 or less. Oligofructoses, acceptable in accordance with the preferred embodiments, include, but are not limited to, the beta-2, 1 type, inulin, irisin and lycorisin. Preferably, the dietary fiber is inulin. Also preferably, the fruit spread product includes dietary fiber present in an amount between about 0.5 percent and about 5 percent, by weight, of the final product. The precise amount of dietary fiber used, in proportion to the other ingredients, varies according to the particular fruit(s), vegetable(s), or combination thereof which are used in the product.

The term, "pectin", as used herein, refers to any substance forming a colloidal solution in water which gels upon cooling. The pectin may be in powder or liquid form, naturally occurring or modified. According to the preferred embodiments of the present invention, the fruit spread product includes pectin in an amount between about 0.5 percent to about 3 percent, by weight, of the final product. The amount of pectin used, in proportion to the other ingredients, varies according to the particular fruit(s), vegetable(s), or combination thereof present in the product. Notably, the pectin is uncooked in the process of the present invention, thereby causing less breakdown of the pectin than would likely otherwise occur if the pectin was cooked.

As used herein, the term "fruit" includes any commonly-known fruit having a desired flavor, including, but not limited to, berries, including but not limited to apples, oranges, peaches, pears, pineapples, kiwis, apricots, plums, grapes, cherries, mangos, melons, strawberries, blackberries, blueberries, raspberries, boysenberries, marion berries, mulberries, and the like.

The term "vegetable", as used herein, includes any commonly-known vegetable having a desired flavor, including, but not limited to, tomatoes, carrots, hicma, beets, squash, spinach, onions, garlic, peppers (i.e., including jalapeno peppers), avocados, and herbs.

As used herein, the terms "fruit spread", "fruit spread product", "vegetable spread", and "vegetable spread product" include, but are not limited to, jams, jellies, preserves, purees, marmalades, pie fillings, bases for fruit-flavored drinks such as "smoothies", ice cream toppings, condiments, fruit toppings, and sauces.

The following examples are merely illustrative of the process and resulting products of the present invention and do not serve to limit the invention thereto.

EXAMPLE 1

Strawberry Fruit Spread

In accordance with the preferred embodiments of the present invention, the following ingredients, by weight, were combined and mixed together at room temperature using a Breddo Likwifier mixer and a Groen scraped-surface mixer to form a slurry:

0.5–5% low-ester citrus pectin 0.5–3% inulin

12–20% white grape juice concentrate with a Brix level of 68

10–20% organic liquid sugar with a Brix level of 72

The slurry and about 55–70% strawberries were mixed until the mixture, or blend, had an even consistency. The mixture was then pumped through a swept-surface heat exchanger, where the mixture was heated to and held at a temperature of between 180° F. to 225° F. for a period of about two to three minutes. Next, the mixture was passed through a second swept-surface heat exchanger to partially cool the mixture. Finally, the partially cooled mixture was packaged in squeeze tube packages.

EXAMPLE 2

Raspberry Smoothie Flavoring

The following ingredients were, according to the preferred embodiments of the present invention, mixed together at room temperature using a Breddo Likwifier mixer and a Groen scraped-surface mixer to form a slurry:

1–5% low-ester citrus pectin

1–3% inulin

15–35% white grape juice concentrate with a Brix level of 68

15–35% organic liquid sugar with a Brix level of 72

40–65% raspberries

Once the slurry, or emulsion, was formed, the mixture was pumped through a swept-surface heat exchanger and heated to and held at a temperature of between 180° F. to 225° F. for a period of about two to three minutes. Next, the mixture was passed through a second swept-surface heat exchanger to partially cool the mixture to a temperature of between 45° F. and 165° F. Finally, the partially cooled mixture was packaged in appropriate packaging.

Whereas this invention has been described in detail with particular reference to its most preferred embodiments, it is understood that variations and modifications can be effected within the spirit and scope of the invention, as described herein before and as defined in the appended claims. The corresponding structures, materials, acts, and equivalents of all means plus function elements, if any, in the claims below are intended to include any structure, material, or acts for performing the functions in combination with other claimed elements as specifically claimed.

What is claimed is:

1. A process for preparing a fruit or vegetable spread product comprising the steps of:
    (a) mixing at high speed and at substantially room temperature, a sweetener present in an amount from about 5 to about 50 percent of the total product, inulin present in an amount from about 0.5 to about 3 percent of the total product, and pectin present in an amount from about 0.5 to about 5 percent of the total product, for a period of time sufficient to form a slurry;
    (b) adding at least one fruit and/or at least one vegetable to the slurry; and,
    (c) pasteurizing the mixture of fruit and/or vegetable and slurry resulting from step (b), wherein the pasteurizing is performed in a swept-surface heat exchanger.

2. The process of claim 1, wherein the at least one fruit or at least one vegetable or combination thereof is present in an amount from about 25 percent to about 75 percent of the total product.

3. The process of claim 2, wherein the fruit includes at least one of strawberries, blueberries, boysenberries, raspberries, blackberries, cherries, mangos, peaches, pineapples, plums, kiwis, apricots, grapes, apples and mulberries.

4. The process of claim 2, wherein the vegetable is includes at least one of carrots, tomatoes, hicma, beets, onions, garlic, zucchini, avocados, and herbs.

5. The process of claim 2, wherein the fruit and vegetable are present in combination.

6. The process of claim 1, wherein the pasteurization of step (c) occurs at a temperature of between 165° F to 225° F.

7. The process of claim 6, wherein the pasteurization of step (c) is maintained for a period from 10 seconds to 10 minutes.

8. A process for preparing a fruit or vegetable spread product comprising the steps of:
    (a) mixing at high speed and at substantially room temperature, a portion of at least one fruit or at least one vegetable or a combination thereof, a sweetener present in an amount from about 5 to about 50 percent of the total product, inulin present in an amount from about 0.5 to about 3 percent of the total product, and pectin present in an amount from about 0.5 to about 5 percent of the total product, for a period of time sufficient to form a slurry;
    (b) adding additional fruit and/or vegetable to the slurry; and
    (c) pasteurizing the mixture of fruit and/or vegetable and slurry resulting from step (b), wherein the pasteurizing is performed in a swept-surface heat exchanger.

9. The process of claim 8, wherein the at least one fruit or at least one vegetable or combination thereof is present in an amount from about 25 percent to about 75 percent of the total product.

10. The process of claim 9, wherein the fruit includes at least one of strawberries, blueberries, boysenberries, raspberries, blackberries, cherries, mangos, peaches, pineapples, plums, kiwis, apricots, grapes, apples and mulberries.

11. The process of claim 9, wherein the vegetable includes at least one of carrots, tomatoes, hicma, beets, onions, garlic, zucchini, avocados, and herbs.

12. The process of claim 9, wherein the fruit and vegetable are present in combination.

13. The process of claim 8, wherein the pasteurization of step (c) occurs at a temperature of between 165° F. to 225° F.

14. The process of claim 13, wherein the pasteurization of step (c) is for a period from 10 seconds to 10 minutes.

* * * * *